(12) United States Patent
Jansson et al.

(10) Patent No.: US 12,194,549 B2
(45) Date of Patent: Jan. 14, 2025

(54) CUTTING INSERT AND TOOL BODY FOR A MILLING TOOL

(71) Applicant: SECO TOOLS AB, Fagersta (SE)

(72) Inventors: Mikael Jansson, Avesta (SE); Fredrik Kantojarvi, Fagersta (SE)

(73) Assignee: SECO TOOLS AB, Fagersta (SE)

( * ) Notice: Subject to any disclaimer, the term of this patent is extended or adjusted under 35 U.S.C. 154(b) by 282 days.

(21) Appl. No.: 16/975,430

(22) PCT Filed: Feb. 22, 2019

(86) PCT No.: PCT/EP2019/054449
§ 371 (c)(1),
(2) Date: Aug. 25, 2020

(87) PCT Pub. No.: WO2019/162444
PCT Pub. Date: Aug. 29, 2019

(65) Prior Publication Data
US 2020/0406376 A1    Dec. 31, 2020

(30) Foreign Application Priority Data

Feb. 26, 2018  (EP) ..................................... 18158723

(51) Int. Cl.
*B23C 5/20* (2006.01)
*B23C 5/00* (2006.01)

(52) U.S. Cl.
CPC .............. *B23C 5/006* (2013.01); *B23C 5/202* (2013.01); *B23C 2200/08* (2013.01);
(Continued)

(58) Field of Classification Search
CPC ........... B23C 5/006; B23C 5/202; B23C 5/10; B23C 5/109; B23C 2200/08;
(Continued)

(56) References Cited

U.S. PATENT DOCUMENTS 5,222,843 A * 6/1993 Katbi .................... B23B 27/143
407/116
5,460,464 A   10/1995 Arai et al.
(Continued)

FOREIGN PATENT DOCUMENTS

KR    20060135211 A    12/2006
WO    2013065393 A1    5/2013
(Continued)

*Primary Examiner* — Nicole N Ramos
(74) *Attorney, Agent, or Firm* — Morgan, Lewis & Bockius LLP (57) ABSTRACT

A cutting insert for a milling tool including an upper side having a central surface, a lower side, a peripheral side surface, and a cutting edge formed between the upper side and the peripheral side surface. The cutting edge having a positively inclined main cutting edge projecting at least partly above the central surface. The upper side includes a rake surface extending inside of and along the at least one cutting edge, sloping downward toward the central surface. A plateau, elevated with respect to the central surface and extending along the main cutting edge, is formed inside the rake surface. A transition between the rake surface and the plateau extends at an angle $\phi_2$ with respect to an upper extension plane, wherein $\phi_2 > 0°$.

25 Claims, 6 Drawing Sheets

(52) U.S. Cl.
CPC .. *B23C 2200/165* (2013.01); *B23C 2200/286* (2013.01); *B23C 2200/365* (2013.01); *B23C 2210/163* (2013.01); *B23C 2210/168* (2013.01)

(58) Field of Classification Search
CPC ........ B23C 2200/165; B23C 2200/286; B23C 2200/365; B23C 2200/0477; B23C 2200/208; B23C 2200/367; B23C 2210/163; B23C 2210/168; B23B 27/141
See application file for complete search history.

(56) References Cited

U.S. PATENT DOCUMENTS

| | | | | |
|---|---|---|---|---|
| 6,742,969 | B1* | 6/2004 | Hoefler | B23C 5/205 |
| | | | | 407/34 |
| 7,604,441 | B2 | 10/2009 | Bhagath | |
| 8,727,676 | B2* | 5/2014 | Lof | B23B 27/143 |
| | | | | 407/113 |
| 9,022,700 | B2* | 5/2015 | Bhagath | B23C 5/06 |
| | | | | 407/113 |
| 9,283,626 | B2* | 3/2016 | Fang | B23C 5/2213 |
| 9,333,568 | B2* | 5/2016 | Lehto | B23C 5/06 |
| 2007/0003384 | A1 | 1/2007 | Smilovici et al. | |
| 2010/0150671 | A1 | 6/2010 | Oprasic et al. | |
| 2011/0103905 | A1* | 5/2011 | Morrison | B23C 5/2213 |
| | | | | 407/113 |
| 2012/0170987 | A1* | 7/2012 | Komatsuka | B23B 27/141 |
| | | | | 407/115 |
| 2013/0236257 | A1* | 9/2013 | Nada | B23B 27/1607 |
| | | | | 407/114 |
| 2014/0008669 | A1 | 3/2014 | Fang et al. | |
| 2014/0286718 | A1* | 9/2014 | Scherman | B23B 27/143 |
| | | | | 407/114 |
| 2014/0298967 | A1* | 10/2014 | Ishi | B23C 5/109 |
| | | | | 83/13 |
| 2019/0054550 | A1* | 2/2019 | Yoshida | B23C 5/202 |

FOREIGN PATENT DOCUMENTS

| | | |
|---|---|---|
| WO | 2013077442 A1 | 5/2013 |
| WO | 2014021314 A1 | 2/2014 |

* cited by examiner

CUTTING INSERT AND TOOL BODY FOR A MILLING TOOL

RELATED APPLICATION DATA

This application is a § 371 National Stage Application of PCT International Application No. PCT/EP2019/054449 filed Feb. 22, 2019 claiming priority to EP 18158723.9 filed Feb. 26, 2018.

TECHNICAL FIELD OF THE INVENTION

The present invention relates to a cutting insert for a milling tool, a milling tool having such a cutting insert, and a tool body for a milling tool.

BACKGROUND OF THE INVENTION AND PRIOR ART

US2007003384 discloses a double-sided cutting insert for a face milling tool. The cutting insert has an inclined main cutting edge, sloping with respect to a central surface of an upper side of the cutting insert, such as to achieve a positive axial slope of the main cutting edge. During machining, the main cutting edge can thereby gradually enter the workpiece to provide a smooth cutting action.

Cutting inserts of the type disclosed in US2007003384 are often suitable for machining using milling tools with relatively small diameter, for which short chips are formed. This type of inserts, having a major part of the main cutting edge projecting above the central surface, have beneficial cutting properties. However, for larger tool diameters (cutting diameters), an arc of engagement, in which the cutting insert is in cutting engagement with the workpiece, is relatively large. The chips that are formed are consequently longer with a larger radius of curvature, thus requiring a larger chip pocket in the milling tool body, and the number of cutting inserts that can be used in the tool body is reduced.

Thanks to the fact that a major portion of the main cutting edge projects above the central surface, this type of inserts has beneficial cutting properties compared to cutting inserts without projecting main cutting edge, or with only a minor part of the main cutting edge projecting above the central surface. However, this property at the same time makes the cutting insert less appropriate for use in milling tools having a larger cutting diameter. To achieve a good performance through the whole range of the cutting diameters, two or more different cutting inserts with different cutting geometries are required in order to provide on one hand a good cutting action for small cutting diameters and on the other hand an adequate chip evacuation for big cutting diameters. A first cutting insert, used for small cutting diameters, can have a cutting geometry (rake angle and primary land) which is optimized for a good cutting action (low cutting forces) and a long tool life. However, when used in a milling tool with a relatively large cutting diameter, this first cutting insert does not exhibit sufficient chip formation properties, which leads to problems with chip evacuation. A second cutting insert, used for large cutting diameters, has a cutting geometry which is less light cutting (smaller rake angle and may be provided with a wide and negative primary land) in order to achieve improved chip formation properties when used in a large tool. However, when such a cutting insert is used in a milling tool with a smaller cutting diameter, it results in a deteriorated cutting action and a shortened tool life.

SUMMARY OF THE INVENTION

It would be desirable to provide a cutting insert which has a major portion of the main cutting edge projecting above the central surface and which is suitable for use through a wide range of tool diameters. In particular, it would be desirable to provide such a cutting insert which simultaneously provides on one hand sufficient cutting action and tool life when used in small diameter milling tools, and on the other hand sufficient chip formation properties, not leading to problems with chip evacuation, when used in milling tools with a large cutting diameter.

To better address these concerns, a cutting insert according to claim 1 is provided. The cutting insert comprises:
- an upper side defining an upper extension plane and comprising a central surface,
- a lower side opposite to the upper side defining a lower extension plane, wherein a centre axis extends perpendicularly through the upper and lower extension planes,
- a peripheral side surface extending between the upper side and the lower side,
- at least one cutting edge formed in a transition between the upper side and the peripheral side surface, wherein the at least one cutting edge comprises a main cutting edge formed in a transition between the upper side and a main part of the peripheral side surface, wherein at least a projecting major portion of the main cutting edge projects above the central surface, wherein the projecting major portion of the main cutting edge is at least in part positively inclined with respect to the upper extension plane and creates an angle $\phi_1$ with the upper extension plane as seen in a direction orthogonal to the main part of the peripheral side surface, wherein the upper side comprises at least one rake surface extending inside of and along the at least one cutting edge, wherein the rake surface slopes downward toward the central surface. A plateau extending at least along the projecting major portion of the main cutting edge is formed inside of the at least one rake surface, wherein the plateau is elevated with respect to the central surface, and wherein, as seen in the direction orthogonal to the main part of the peripheral side surface, a transition between the rake surface and the plateau extends at an angle $\phi_2$ with respect to the upper extension plane, wherein $\phi_2 > 0°$.

A projecting major portion of the main cutting edge projects above the central surface. In other words, a projecting major portion of the main cutting edge is situated above the central surface such that the distance from the lower extension plane to the projecting major portion of the main cutting edge is larger than the distance from the lower extension plane to the central surface of the upper side.

The upper side comprises at least one rake surface extending inside of and along the at least one cutting edge. In other words, the rake surface is situated between the at least one cutting edge and the central surface.

The plateau extends at least along the projecting major portion of the main cutting edge and is formed inside of the at least one rake surface. In other words, the plateau is situated closer to the central surface than at least a part of the at least one rake face.

The major portion of the main cutting edge is to be understood as comprising at least 50% of the main cutting edge, so that a continuous major portion comprising at least 50% of the main cutting edge projects above the central surface. The plateau thereby extends at least halfway along the main cutting edge.

The projecting major portion of the main cutting edge is at least in part positively inclined with respect to the upper extension plane, i.e. it slopes downward toward the central surface when going in a direction from the first end of the main cutting edge to the second end of the main cutting edge, such that it gradually enters the workpiece during machining, thus providing a smooth cutting action. The first end of the main cutting edge might be connected to a surface-wiping secondary cutting edge, belonging to the same cutting edge, via a corner cutting edge. This corner cutting edge is also called active corner cutting edge because it is involved in the cutting process independent of whether the depth of cut is small or large. The second end of the main cutting edge is opposite to the first end and involved in the cutting process only when the depth of cut has its maximal value that the insert can manage when mounted in the tool body. Preferably, but not necessarily, the projecting major portion of the main cutting edge, or the main cutting edge, is positively inclined and slopes downward already from its first end which means from the active corner cutting edge such that it gradually enters the workpiece during machining, thus providing a smooth cutting action, also at small depth of cuts. Preferably a major part (at least 50%) of the projecting major portion of the main cutting edge is positively inclined. Preferable the entire part of at least the projecting major portion of the main cutting edge is positively inclined.

The elevated plateau, which does not form part of the central surface, provides improved chip formation since it compensates for the varying distance between the inclined main cutting edge and the central surface, which varies along the main cutting edge. The plateau extends along the projecting major portion of the main cutting edge and chips are thereby predominantly formed on the plateau and not on the central surface, for small as well as for large depths of cut. Thus, the chip formation becomes easier to control, in particular for large milling tools having a long arc of engagement between the cutting insert and the workpiece at the same time as the beneficial properties of this type of main cutting edge, having a major portion that projects above the central surface, are kept. Moreover, for varying depths of cut, the plateau enables formation of chips with a similar chip diameter independently of which part of the projecting major portion of the main cutting edge is in engagement with the workpiece, i.e. a similar curvature for small as well as for large depths of cut. The formed chips also have a smaller chip diameter in comparison with chips formed with a cutting insert without plateau.

The transition between the rake surface and the plateau may be understood as an intersection between the rake surface and the plateau. The transition may however be rounded so that no sharp intersection is formed. Since the transition extends at an angle $\phi_2$ with respect to the upper extension plane, wherein $\phi_2>0°$, the transition, and preferably the plateau, thus have the same type of inclination—positive inclination—as the main cutting edge, which creates an angle $\phi_1$ with the upper transition plane. The angle $\phi_1$ is typically in range between 4° and 15°, preferably around 10°. Thus, the transition and preferably the plateau have a positive inclination. When mounted in an insert seat of a tool body, the plateau thereby obtains a more positive inclination, or a less negative inclination, than the central surface of the cutting insert, which in turn has the effect that the chips easily glide and the transition and the plateau do not give a big contribution to the axial forces as the case might be with a transition and/or plateau that extend in parallel with the upper extension plane. The chip evacuation is thereby improved and the axial cutting forces decreased in comparison with a transition and/or a plateau that extend in parallel with the upper extension plane.

The angle $\phi_2$ does not need to be equal to the angle $\phi_1$. Furthermore, if the main cutting edge is curved when seen in a side view, i.e. in a direction orthogonal to the main part of the peripheral side surface, the angle $\phi_1$ in a point of the main cutting edge is the angle between the tangent to the main cutting edge and the upper extension plane. In the same way, if the transition and/or plateau is curved when seen in side view orthogonal to the main part of the peripheral side surface, the angle $\phi_2$ is the angle between a tangent to the transition or plateau in the same view, and the upper extension plane.

The central surface may be a flat surface extending in parallel with the upper extension plane, but it may also be inclined or non-planar. The central surface may e.g. be profiled, or comprising a plurality of partial surfaces, wherein some or each partial surface(s) is/are not parallel to the upper extension plane. In particular, this may be the case for a double-sided cutting insert. Such a central surface might have a function of an anti-rotation locking interface, and/or an interface that locks the cutting insert axially and/or radially. Preferably, the central surface is a mainly flat surface, or a slightly convex or concave surface, or a surface having a slight inclination toward a centre of the cutting insert. In the case of a double-sided cutting insert, the central surface is arranged such that it can serve as a main support surface of the cutting insert when the cutting insert is mounted in an insert seat of a tool body.

The plateau is separated from the main cutting edge along the entire length of the plateau. Also, ends of the plateau are separated from the main cutting edge. This means that there is always a part of the rake surface between the cutting edge and the plateau along the part of the main cutting edge where the plateau is provided. Similar to this, if a primary land is provided between the at least one cutting edge and the rake surface, the plateau is separated from the primary land by at least a part of the rake surface. Thanks to this, a good function of the main cutting edge and good cutting action are ensured along the entire length of the main cutting edge. Preferably, but not necessarily, the plateau is separated from the entire cutting edge.

According to one embodiment, when seen in a top view, which means when seen in the direction of the normal vector to the upper extension plane, the transition between the rake surface and the plateau extends at an angle γ with respect to the main cutting edge, wherein −5°≤γ≤5°. Thanks to this the distance between the projecting major portion of the main cutting edge and the plateau does not differ significantly along the projecting major portion, which contributes to similar chip formation properties at all positions of the projecting major portion of the main cutting edge.

According to one embodiment, the rake surface and/or the plateau are planar surfaces at least along the projecting major portion of the main cutting edge or at least along a part of the projecting major portion of the main cutting edge. In this way, contact between on one hand the chip formed during machining and on the other hand the rake surface and the plateau is minimised, thereby reducing the wear on the cutting insert. Alternatively, the rake surface and the plateau may together form a rounded concave surface, which has its largest inclination closest to the cutting edge.

According to one embodiment, the transition between the rake surface and the plateau extends in parallel with at least the projecting major portion of the main cutting edge or at least with a part of the projecting major portion of the main cutting edge. Thus, the transition has the same inclination as the projecting major portion of the main cutting edge, regardless of whether the cutting insert is viewed from above or in a sectional view along the plateau. The plateau thereby extends at a distance to the cutting edge which is identical along the transition. This makes the chip formation more predictable for varying cutting depths.

According to one embodiment, a width $w_p$ of the plateau is related to a width $w_r$ of the rake surface as $0.5\ w_r \leq w_p \leq 2\ w_r$. The widths are measured in a direction perpendicular to the main cutting edge inside of which the plateau and the rake surface extend. Within this interval, the plateau has an advantageous effect on the chip formation, while the central surface is still large enough to serve as a stable support surface when mounted in an insert seat of a tool body. The width $w_p$ of the plateau and the width $w_r$ of the rake surface may e.g. be identical.

According to one embodiment, a width $w_p$ of the plateau is the same along at least the projecting major portion of the main cutting edge, or at least along a part of the projecting major portion of the main cutting edge. The cutting insert may thereby provide similar conditions for chip formation along the projecting major portion of the main cutting edge.

According to one embodiment, the width $w_p$ of the plateau does not differ by more than ±20% along at least the projecting major portion of the main cutting edge or at least along a part of the projecting major portion of the main cutting edge.

According to one embodiment, the plateau forms a plane that extends in parallel with the main cutting edge, or at an angle of no more than ±5° with respect to the main cutting edge. The angle can be tuned depending on application of the cutting insert so as to achieve desired chip formation properties. The plateau thus has a slope relative the upper extension plane, but this slope is not necessarily the same as the slope of the main cutting edge. However, with the slope not differing by more than ±5° from the slope of the main cutting edge, the plateau and the main cutting edge generally have the same type of inclination, since the main cutting edge typically has a positive inclination of approximately 10°. Thus, also the plateau has a positive inclination. When mounted in an insert seat of a tool body, the plateau obtains a more positive inclination than the central surface of the cutting insert, or alternatively a less negative inclination depending on a tipping-in angle of the cutting insert. This has the effect that the chips glide more easily. The chip evacuation is thereby improved in comparison with a plateau that extends in parallel with the upper extension plane.

According to one embodiment, as seen in a vertical section taken perpendicularly to the main cutting edge, the plateau is parallel to the upper extension plane $P_U$ or has an angle of inclination of no more than ±5° with respect to the upper extension plane $P_U$. Thus, the plateau may have a small positive or negative slope with respect to the central surface. The angle of inclination may be selected so that the desired chip diameter is achieved, wherein a positive angle contributes to a larger chip diameter and vice versa or the angle of inclination may be selected depending on the properties of the workpiece material. The angle of inclination also affects the cutting force, with a positive angle of inclination generally contributing to reduced cutting forces.

According to one embodiment, a shortest distance between the main cutting edge and the plateau is the same along at least the projecting major portion of the main cutting edge or at least along a part of the projecting major portion of the main cutting edge. The shortest distance may be the same along the entire plateau. For example, if the plateau extends along the entire main cutting edge, it may extend so that the shortest distance between the plateau and the main cutting edge is the same along at least the part of the main cutting edge that projects above the central surface, or along the entire main cutting edge.

According to one embodiment, a primary land is provided between at least a part of the at least one cutting edge and the rake surface. The primary land may be inclined at a positive or a negative angle relatively the upper extension plane $P_U$ and has the effect of strengthening the cutting edge. This is beneficial for most materials, but the primary land may be omitted when a sharp cutting edge is required, e.g. for cutting inserts intended to be used for machining of stainless steel or titanium alloys.

According to one embodiment, the plateau extends all the way along the at least one cutting edge. This is mainly advantageous from a production point of view, in particular when the cutting inserts are formed using pressing and sintering.

According to one embodiment, the upper side further comprises a transition surface connecting the plateau and the central surface, wherein the transition surface is positively inclined as seen in a vertical section taken perpendicularly to the main cutting edge. The positively inclined transition surface is advantageous from a production point of view, in particular when the cutting inserts are formed using pressing and sintering.

According to one embodiment, the cutting insert is indexable with at least two or three or four or five or six or seven or eight identical and alternately usable main cutting edges formed in the transition between the upper side and the peripheral side surface. This improves the tool life of the cutting insert.

According to one embodiment, the cutting insert is double-sided with the lower side being identical to the upper side, at least one cutting edge being formed in a transition between the lower side and the peripheral side surface. The plateau is particularly advantageous for double-sided cutting inserts since double-sided cutting inserts may have a main cutting edge projecting above the central surface at the same time as they are axially tipped-in with a negative or a neutral angle in the tool body. Due to the axial tipping-in angle, the chips in many applications do not have a desired helical shape, but instead have a more planar spiral shape without desired axial extension. Single-sided positive cutting inserts, however, may be axially tipped-in with a positive angle large enough to generate chips with a helical shape, but the plateau may have a positive effect also on that type of cutting inserts if the positive axial tipping-in is not large enough or if such a cutting insert is tipped-in with a neutral or negative axial tipping-in angle.

The cutting insert according to the invention is particularly suitable for face milling applications, but may also be used e.g. for shoulder milling and groove milling applications.

According to another aspect of the present invention, a milling tool is provided. The milling tool comprises a tool body provided with an insert seat for receiving a cutting insert, wherein the milling tool comprises the proposed cutting insert arranged in the insert seat.

According to yet another aspect of the present invention, a tool body for a milling tool is provided. The tool body has a central rotation axis around which the tool body is rotatable in a direction of rotation, wherein the tool body comprises a front end and a rear end between which an envelope surface extends, at least one insert seat being formed in a transition between the front end and the envelope surface, wherein said insert seat comprises a bottom contact surface configured to support the central surface of the lower side of the proposed double-sided cutting insert, wherein the insert seat comprises a recess extending between the bottom contact surface and the envelope surface, said recess being configured to accommodate the plateau of the lower side of the double-sided cutting insert.

Further advantageous features and advantages of the invention will appear from the following detailed description.

BRIEF DESCRIPTION OF THE DRAWINGS

Embodiments of the invention will in the following be described by means of example with reference to the appended drawings, in which.

DETAILED DESCRIPTION OF EMBODIMENTS OF THE INVENTION

Figure 11:
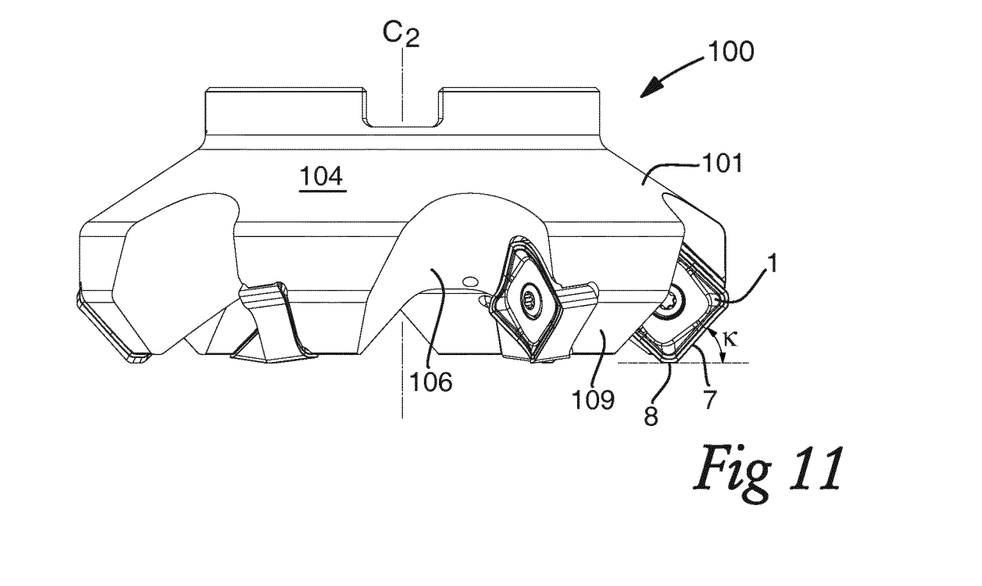
FIG. 11 shows a side view of the milling tool in FIG. 10.
Figure 12:
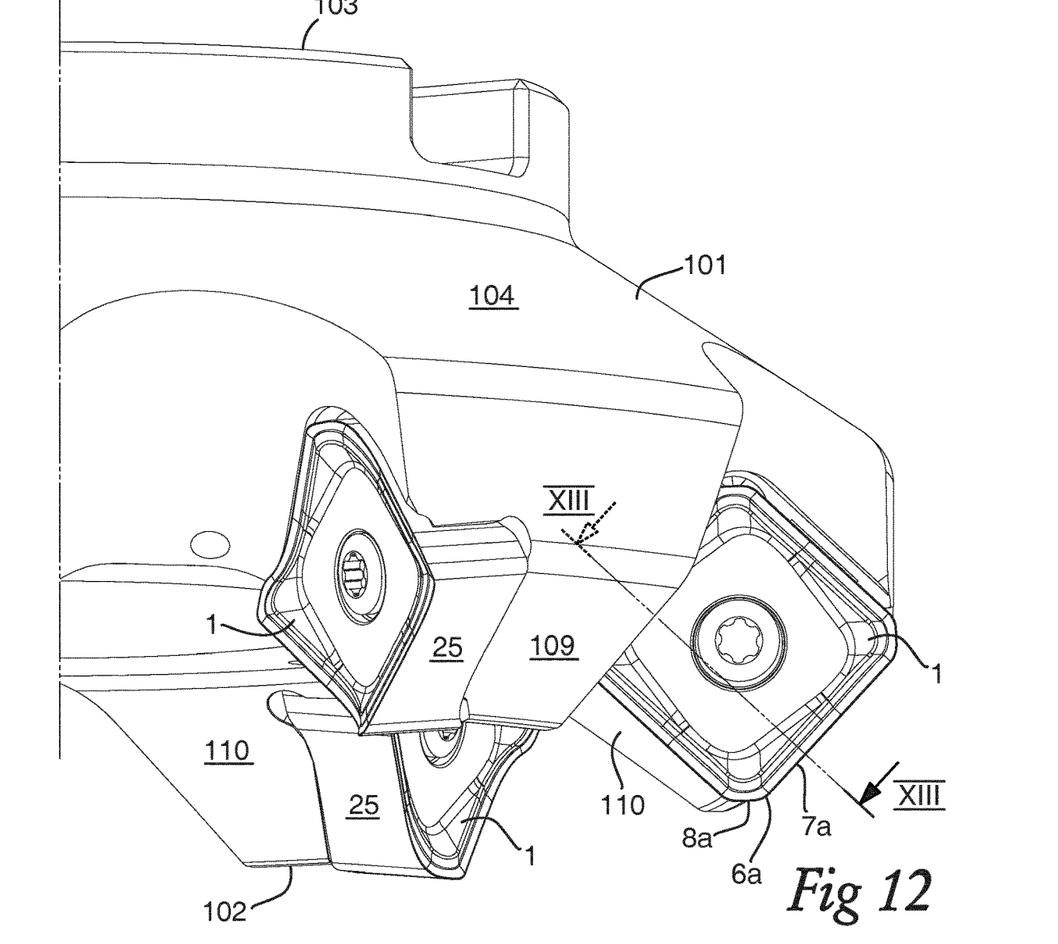
FIG. 12 shows a detail of the milling tool in FIG. 10.
Figure 13:
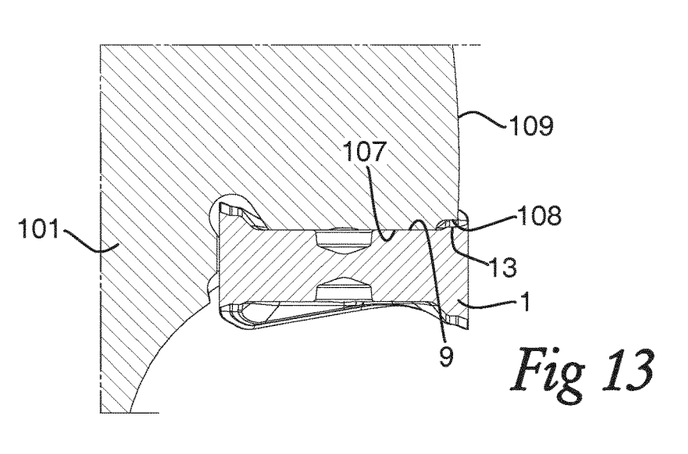
FIG. 13 shows a section along the line XIII-XIII in FIG. 12.

A cutting insert 1 according to a first embodiment of the invention is shown in FIGS. 1-5c and a cutting insert according to a second embodiment is shown in FIGS. 6-9. The cutting insert 1 according to the first embodiment is intended for use in face milling operations at an entering angle κ of 45° as shown in FIG. 11, wherein the cutting insert 1 according to the first embodiment is mounted in a tool body 101 of a milling tool 100. The cutting insert 1 according to the second embodiment is instead configured for use in a face milling tool 100 at an entering angle κ of 68°. The cutting insert 1 has in both embodiments a square basic shape and is double-sided with an identical upper side 2 and lower side 3, defining an upper extension plane $P_U$ and a lower extension plane $P_L$, respectively. A centre axis $C_1$ extends perpendicularly through the upper and lower extension planes $P_U$, $P_L$, and a central through hole 4 for screw mounting the cutting insert 1 to a milling tool extends around the centre axis $C_1$. A peripheral side surface 5, parallel with the centre axis $C_1$, extends between the upper side 2 and the lower side 3. The peripheral side surface 5 constitutes a clearance surface when the cutting insert 1 is used in a milling operation.

Four identical cutting edges 6a, 6b, 6c, 6d are formed in a transition between the upper side 2 and the peripheral side surface 5, and four identical cutting edges 6' are formed in a transition between the lower side 3 and the peripheral side surface 5, so that the cutting insert 1 is indexable with a total of eight index positions. Since the upper side 2 and the lower side 3 are identical, only the upper side 2 and the cutting edges 6a, 6b, 6c, 6d extending around the upper side 2 will be described in detail.

Each cutting edge 6a, 6b, 6c, 6d comprises a chip-removing main cutting edge 7a, 7b, 7c, 7d and a surface-wiping secondary cutting edge 8a, 8b, 8c, 8d. The main cutting edges 7a, 7b, 7c, 7d are formed in a transition between the upper side 2 and main parts 25 of the side surface. At its first end, the main cutting edge 7a of a first one 6a of the cutting edges is connected to the surface-wiping secondary cutting edge 8a belonging to the same first cutting edge 6a, via an active corner cutting edge 17a. At its second end, opposite to the first end, the same main cutting edge 7a is connected to the surface-wiping secondary cutting edge 8b belonging to the second cutting edge 6b, via an inactive corner cutting edge 18b. Since the cutting edges 6a, 6b, 6c, 6d are identical, the remaining cutting edges 6b, 6c, 6d are correspondingly connected. Therefore, reference will in the following mainly be made to the first cutting edge 6a.

In the first embodiment shown in FIGS. 1-5c, the surface-wiping secondary cutting edge 8a is formed at an angle of 45° with respect to the main cutting edge 7a as seen in a top view. In the second embodiment shown in FIGS. 6-9, the surface-wiping secondary cutting edge 8a is formed at an angle of 68° with respect to the main cutting edge 7a as seen in a top view.

The main cutting edge 7a is in both embodiments positively inclined with an angle $\phi_1$ of 10° with respect to the upper extension plane $P_U$ as seen in a side view, and thus slopes downward in a direction from the surface-wiping secondary cutting edge 8. The highest point of the cutting edge 6a is located on the active corner cutting edge 17a. In the shown embodiments, the entire main cutting edge 7a projects above a central surface 9 of the upper side 2, extending around the central through hole 4. The central surface 9 extends in parallel with, and is recessed with respect to, the upper extension plane $P_U$.

Figure 4:
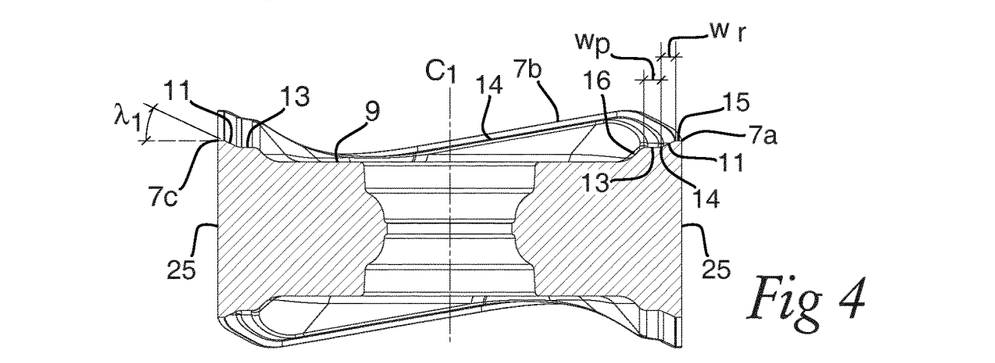
FIG. 4 shows a section along the line IV-IV in FIG. 3, FIG. 5a-c show sections along the lines Va-Va, Vb-Vb, and Vc-Vc, respectively.
Figure 5A:
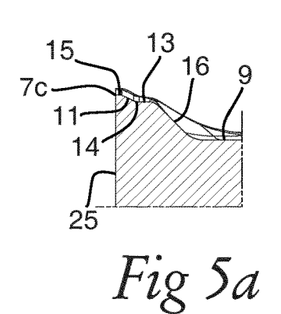
Figure 5B:
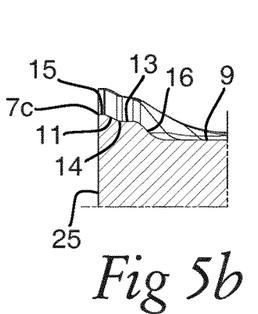
Figure 5C:
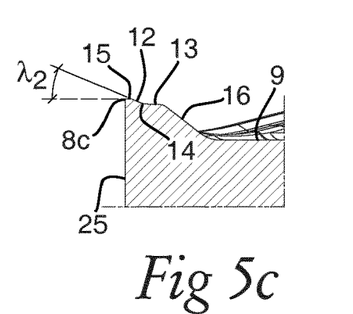
Figure 6:
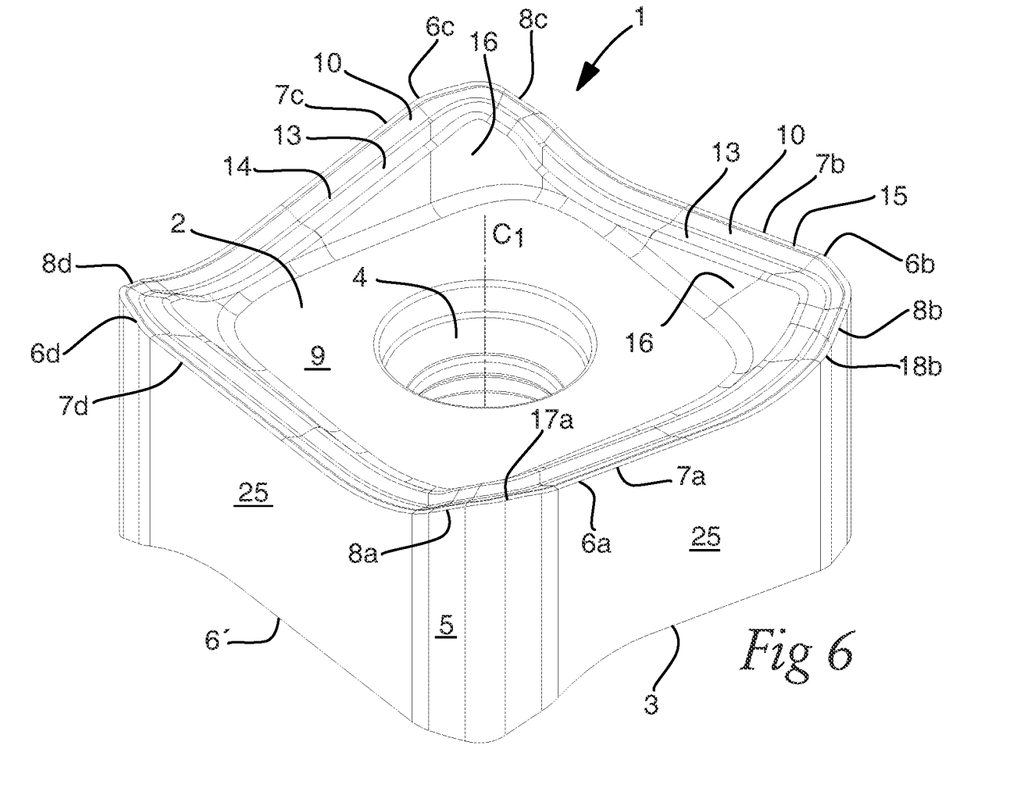
FIG. 6 shows a perspective view of a cutting insert according to a second embodiment of the invention.
Figure 9:
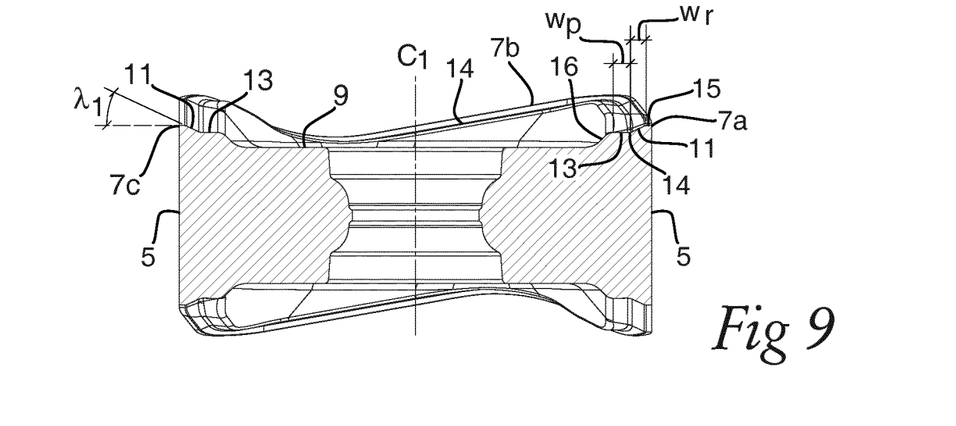
FIG. 9 shows a section along the line IX-IX in FIG. 6.
Figure 10:
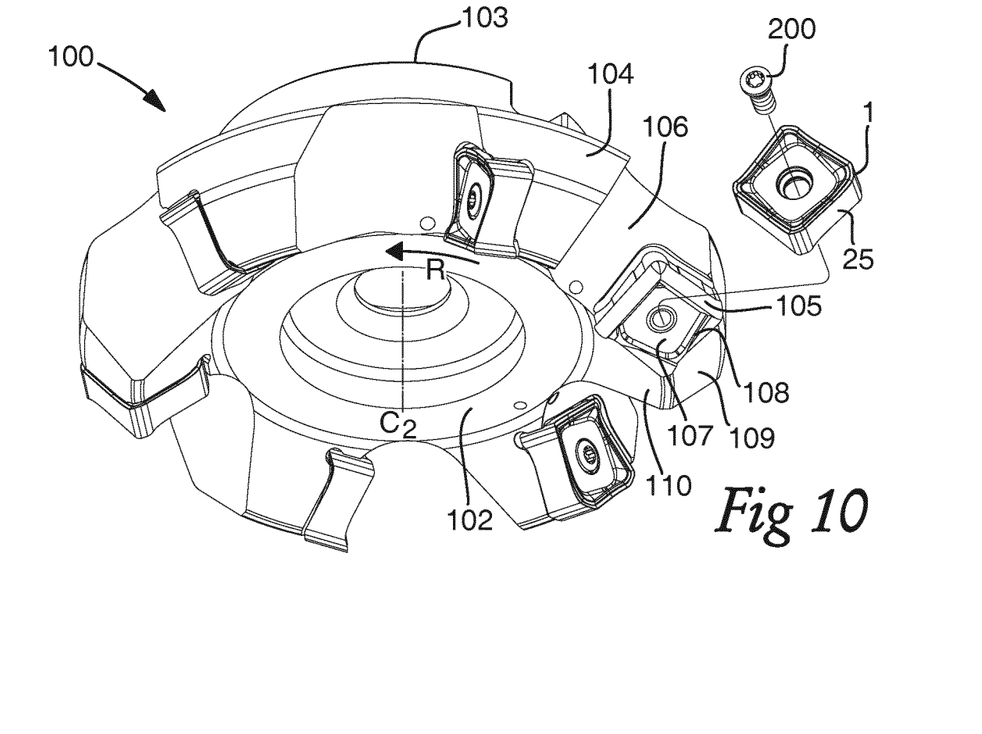
FIG. 10 shows a perspective view of a milling tool according to an embodiment of the invention.

The upper side 2 comprises a rake surface 10 extending inside of and along the cutting edges 6a, 6b, 6c, 6d. The rake surface 10 slopes downward toward the central surface 9, i.e. it has a positive inclination with respect to the upper extension plane $P_U$. In both embodiments, a main rake surface portion 11 of the rake surface 10, extending along the main cutting edge 7a, is inclined with an angle of inclination $\lambda_1$ of 25° with respect to the upper extension plane $P_U$, as shown in FIGS. 4 and 9, respectively. A secondary rake surface portion 12, extending inside the surface-wiping secondary cutting edge 8c, extends at a slightly smaller angle of inclination $\lambda_2$. In the first embodiment, as shown in FIG. 5c, the angle of inclination $\lambda_2$ is 23°, while in the second embodiment, the angle of inclination $\lambda_2$ (not shown for this embodiment) is 21°.

Figure 1:
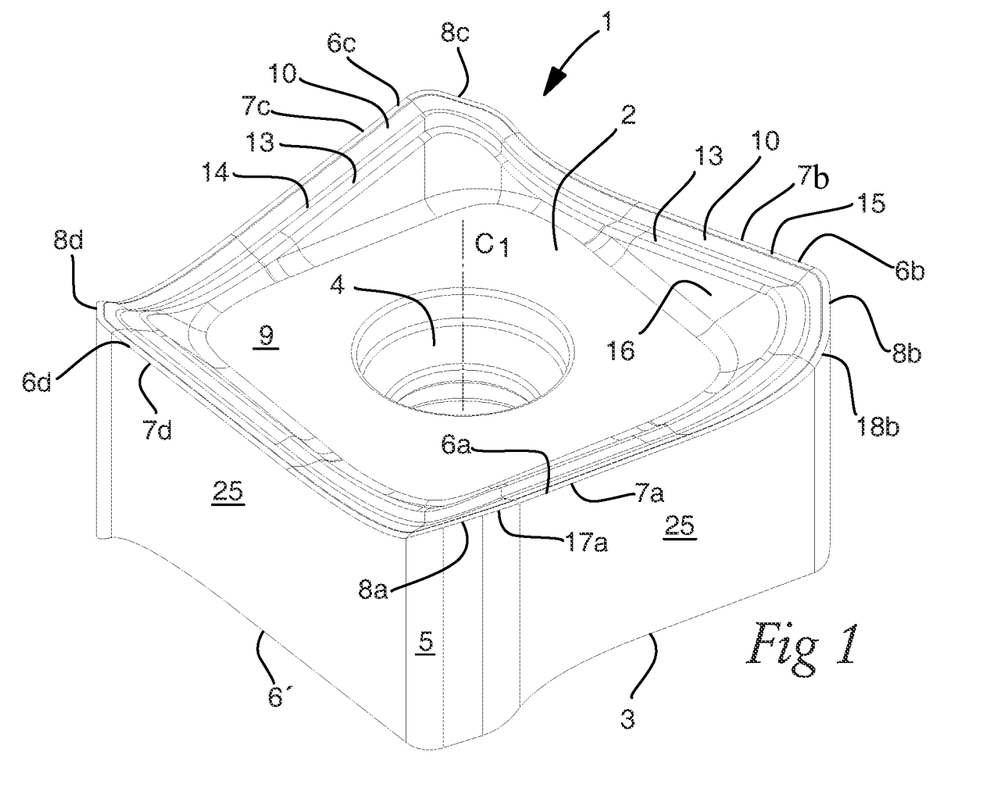
FIG. 1 shows a perspective view of a cutting insert according to a first embodiment of the invention.
Figure 2:
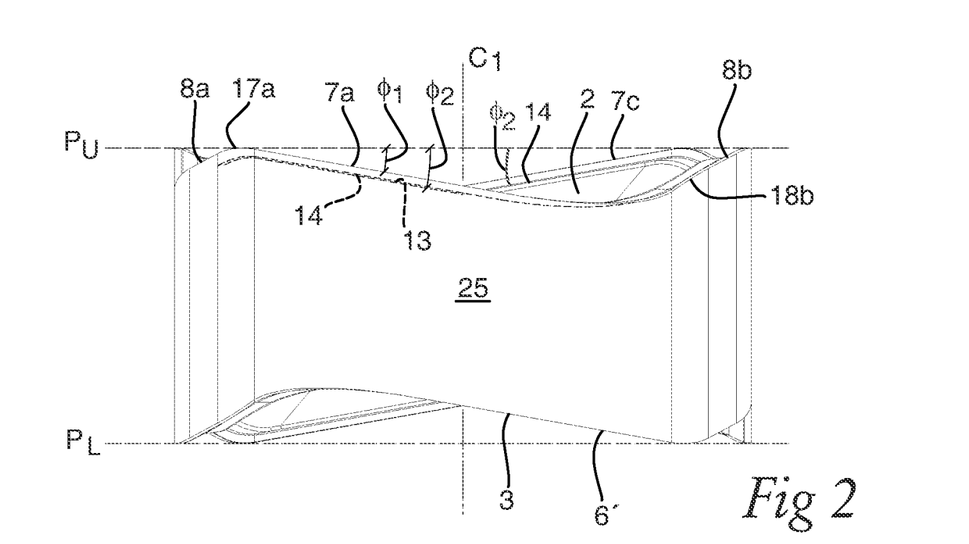
FIG. 2 shows a side view of the cutting insert in FIG. 1.
Figure 3:
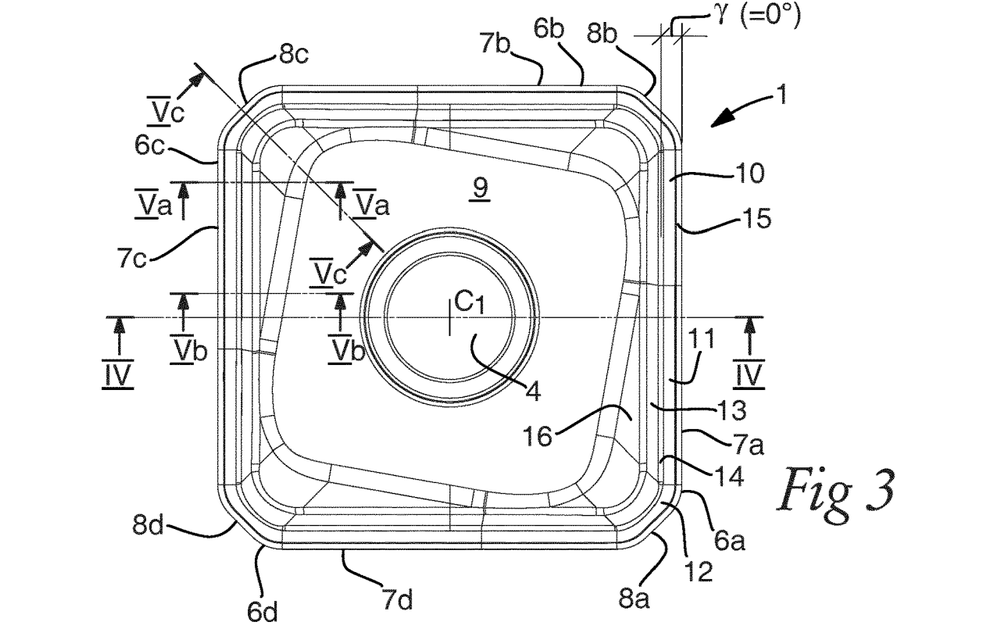
FIG. 3 shows a top view of the cutting insert in FIG. 1.
Figure 7:
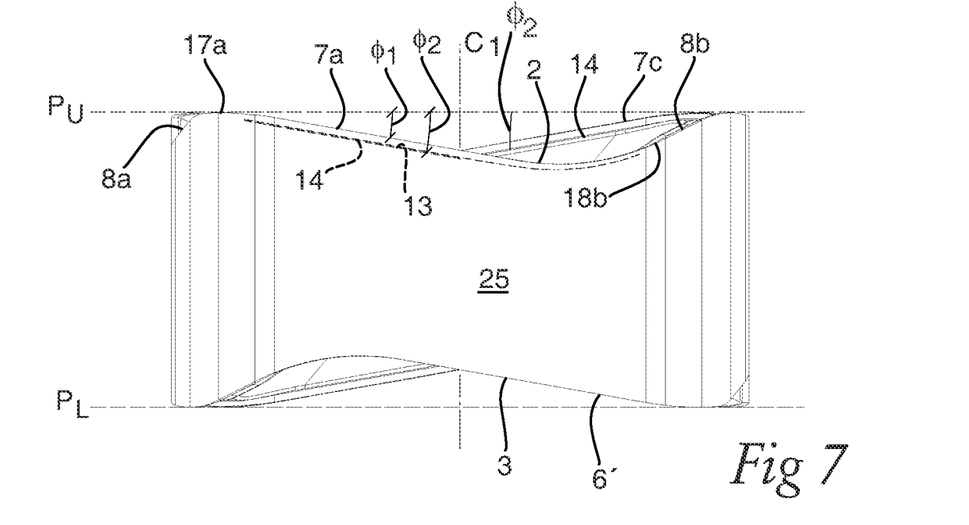
FIG. 7 shows a side view of the cutting insert in FIG. 6.
Figure 8:
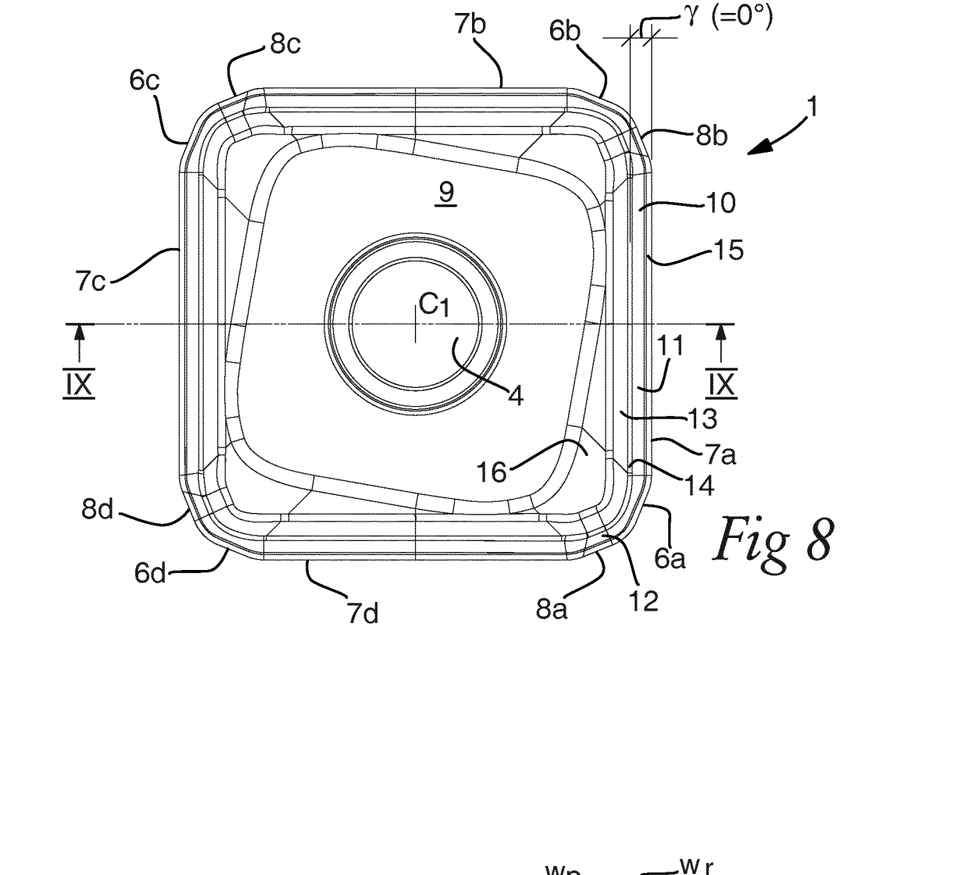
FIG. 8 shows a top view of the cutting insert in FIG. 6.

The upper side 2 further comprises a plateau 13 extending inside of the rake surface 10 and along the cutting edges 6a, 6b, 6c, 6d. The plateau 13 is elevated with respect to the central surface 9. As seen in a top view, and also in a sectional side view such as shown in FIGS. 4 and 9, respectively, a transition 14 between the rake surface 10 and the plateau 13 extends at an angle γ=0° with respect to the cutting edge, i.e. in parallel with the cutting edge. The transition 14 between the rake surface 10 and the plateau 13 is herein a radial transition with a relatively small radius of curvature, so that the plateau 13 and the rake surface 10 form separate planar surfaces. Thus, along the main cutting edge 7a, the plateau 13 and the transition 14 extend in parallel with the main cutting edge 7a. As seen in a side view, as shown in FIGS. 2 and 7, the plateau 13 and the transition 14 extend at an angle of inclination $\phi_2$ with respect to the upper extension plane $P_U$ corresponding to the angle of inclination $\phi_1$ of the main cutting edge 7a. The hidden transition 14 and the hidden plateau 13, inside the main cutting edge 7a, are in the side views marked with dashed lines. As seen in vertical sections taken perpendicularly to the cutting edge 6c, the plateau 13 is essentially parallel with the upper extension plane $P_U$ along the main cutting edge 7c and the surface-wiping secondary cutting edge 8c. This can be seen in the sectional views in FIGS. 4, 5a, 5b and 5c for the cutting insert 1 according to the first embodiment, and in FIG. 9 for the cutting insert 1 according to the second embodiment.

Between the rake surface 10 and the cutting edges 6a, 6b, 6c, 6d, a primary land 15 is provided. In the first embodiment, the primary land 15 extends in parallel with the upper extension plane $P_U$, i.e. at a neutral angle of inclination, along the main cutting edge 7a, 7c and the secondary surface-wiping cutting edge 8a, 8c as shown in the sectional views in FIGS. 4-5c. In the second embodiment, the angle of inclination of the primary land 15 is neutral inside the main cutting edge 7a, but is negative with an angle of $-5°$ inside the secondary surface-wiping cutting edge 8a.

A width $w_p$ of the plateau 13 is in the shown embodiments the same or essentially the same along the entire plateau 13. It is approximately equal to a width $w_r$ of the rake surface 10, wherein the widths are measured as projected onto the upper extension plane $P_U$, i.e. in a top view of the cutting insert 1. A width of the primary land 15 in the shown embodiments is significantly smaller than the widths of the rake surface 10 and the plateau 13.

A shortest distance between the plateau 13 and the cutting edge 6a is in the shown embodiments approximately the same along the entire plateau 13, and it is identical along the positively inclined part of the main cutting edge 7a. The main cutting edge 7a has a negatively inclined part which extends from the lowest point of the main cutting edge, when seen in FIGS. 2 and 7, toward the inactive corner cutting edge 18b. By the lowest point of the main cutting edge, the point which is closest to the lower extension plane $P_L$ is intended.

In the shown embodiments, the plateau 13 extends along the entire cutting edges 6a, 6b, 6c, 6d. However, this is not necessary. Instead the plateau may be formed such that it extends merely inside of the main cutting edge, or inside a projecting part of the main cutting edge. Moreover, the plateau may have a small variation in width along the plateau, or it may extend at a small angle with respect to the main cutting edge, preferably of no more than ±5°. The plateau may also form a planar surface that extends at an angle, preferably of no more than ±5°, with respect to the central surface and/or to the upper extension plane, as seen in a vertical section perpendicular to the main cutting edge. In other embodiments, a gradual transition may be provided between the rake surface and the plateau, such that the plateau does not form a planar surface.

The upper side 2 further comprises a transition surface 16 connecting the plateau 13 and the central surface 9. The transition surface 16 is positively inclined as seen in a vertical section taken perpendicularly to the main cutting edge 7a.

A milling tool 100 configured for face milling is shown in FIGS. 10-13. The milling tool 100 comprises a tool body 101 having a central rotation axis $C_2$ around which the tool body is rotatable in a direction of rotation R. The tool body 101 has a front end 102 and a rear end 103 between which an envelope surface 104 extends. The rear end is configured for mounting the tool body 101 to e.g. a rotating spindle of a machine via e.g. a tool holder (not shown). Six insert seats 105, in which cutting inserts 1 according to the first embodiment described above are mounted by means of screws 200, are formed in a transition between the front end 102 and the envelope surface 104. A chip pocket 106 is provided in front of each insert seat in the direction of rotation R. Each insert seat 105 comprises a bottom contact surface 107 configured to support the central surface 9 of the lower side 3 of the double-sided cutting insert 1. The insert seat 105 further comprises a recess 108 extending between the bottom contact surface 107 and the envelope surface 104. The recess 108 is configured to accommodate the plateau 13 of the lower side 3 of the double-sided cutting insert 1. In the shown embodiment, with square cutting inserts 1, the tool body 101 has a first and a second peripheral surface 109, 110, formed at approximately right angles with respect to one another and at about 45° with respect to the centre axis $C_2$, extending behind the cutting insert 1 in the direction of rotation R and forming a continuation of the main part 25 of the peripheral side surface 5 of the cutting insert 1. The recess 108 is in this embodiment formed on one hand between the bottom contact surface 107 and the first peripheral surface 109, and on the other hand between the bottom contact surface 107 and the second peripheral surface 110.

During machining of a workpiece, the active cutting edge 6a of the cutting insert 1, and in particular the main cutting edge 7a, removes material from the workpiece such that a chip is formed. The chip travels over the rake surface 10 and is deflected by the plateau 13. Since the plateau 13 extends in parallel with the cutting edge 6a, the conditions for chip forming are similar along the main cutting edge 7a, i.e. for varying cutting depths.

The invention is of course not limited to the embodiments disclosed, but may be varied and modified within the scope of the following claims. For example, the shape of the cutting inserts may be varied as well as the number of cutting inserts used in the milling tool. For example, the cutting inserts may be circular, octagonal, hexagonal, triangular, trigonal, heptagonal, square, etc. Instead of screws, other fastening members can be used for mounting the cutting inserts in the tool body, such as e.g. clamping members.

The invention claimed is:

1. A cutting insert for a milling tool comprising:
   a body having an upper side and a lower side;
   a plurality of peripheral side surfaces extending between the upper side and the lower side;
   a first plurality of cutting edges, each of the first plurality of cutting edges formed in a respective one of a plurality of first transition surfaces between the upper side and a respective one of the plurality of peripheral side surfaces; and
   a through hole connecting the upper side to the lower side and extending around a center axis,
   wherein the upper side includes an upper extension plane and an upper central main support surface that, with respect to the center axis, extends radially from the through hole and is recessed axially inward with respect to the upper extension plane,
   wherein the lower side is opposite to the upper side and includes a second plurality of cutting edges, a lower central main support surface, and a lower extension plane,
   where the upper extension plane is defined by an axially distalmost portion of each of the first plurality of cutting edges with respect to a plane midway between the upper central main support surface and the lower central main support surface and the lower extension plane is defined by an axially distalmost portion of each of the second plurality of cutting edges with respect to said plane, wherein the cutting insert is double-sided, wherein the centre axis extends perpendicularly through the upper and lower extension planes, wherein each of the first plurality of cutting edges includes a main cutting edge between the upper side and a main part of the peripheral side surface and a secondary cutting edge connected to a first end of the main cutting edge by an active corner cutting edge, wherein the main cutting edge includes a projecting major portion that projects above the central main support surface, and wherein the projecting major portion is at least in part positively inclined with respect to the upper extension plane and forms an angle $\phi_1$ with the upper extension plane as seen in a side view of the cutting insert and in a direction orthogonal to the main part of the peripheral side surface, and wherein the upper side includes, for each of the first plurality of cutting edges:

a rake surface extending inside of and along the respective cutting edge, wherein the rake surface slopes downward toward the central main support surface when seen in sections perpendicular to the respective peripheral side surface, a plateau that extends at least along the projecting major portion of the respective main cutting edge, the plateau formed inside of the at least one rake surface, where the plateau is elevated with respect to the central main support surface, a second transition surface between the rake surface and the plateau, wherein, as seen in the side view and in the direction orthogonal to the main part of the peripheral side surface, the second transition surface extending along said main part of the peripheral side surface at an angle $\phi_2$ with respect to the upper extension plane, where $\phi_2 > 0°$, and a primary land provided between the respective cutting edge and the rake surface.

2. The cutting insert according to claim 1, wherein as seen in a top view, the second transition surface between the rake surface and the plateau extends at an angle $\gamma$ with respect to the main cutting edge, wherein $-5° \leq \gamma \leq 5°$.

3. The cutting insert according to claim 1, wherein the rake surface and/or the plateau are planar surfaces at least along the projecting major portion of the main cutting edge or at least along a part of the projecting major portion of the main cutting edge.

4. The cutting insert according to claim 1, wherein the second transition surface between the rake surface and the plateau extends in parallel with at least the projecting major portion of the main cutting edge or at least with a part of the projecting major portion of the main cutting edge.

5. The cutting insert according to claim 1, wherein, when measured in a direction perpendicular to the main cutting edge, a width $w_p$ of the plateau is related to a width $w_r$ of the rake surface as $0.5\ w_r \leq w_p \leq 2\ w_r$.

6. The cutting insert according to claim 2, wherein, when measured in a direction perpendicular to the main cutting edge, a width $w_p$ of the plateau is the same along at least the projecting major portion of the main cutting edge or at least along a part of the projecting major portion of the main cutting edge, or wherein the width $w_p$ of the plateau does not differ by more than ±20% along at least the projecting major portion of the main cutting edge or at least along a part of the projecting major portion of the main cutting edge.

7. The cutting insert according to claim 1, wherein the plateau forms a plane that extends in parallel with the main cutting edge, or at an angle of no more than ±5° with respect to the main cutting edge.

8. The cutting insert according to claim 1, wherein, as seen in a vertical section taken perpendicularly to the main cutting edge, the plateau is parallel to the upper extension plane or has an angle of inclination of no more than ±5° with respect to the upper extension plane.

9. The cutting insert according to claim 1, wherein a shortest distance between the main cutting edge and the plateau is the same along at least the projecting major portion of the main cutting edge or at least along a part of the projecting major portion of the main cutting edge.

10. The cutting insert according to claim 1, wherein the primary land is angled relative to the rake surface.

11. The cutting insert according to claim 1, wherein the plateau extends all the way along the respective main cutting edge.

12. The cutting insert according to claim 1, wherein the upper side further comprises, for each of the first plurality of cutting edges, a third transition surface connecting the plateau and the central main support surface, and wherein the third transition surface is positively inclined as seen in a vertical section taken perpendicularly to the respective main cutting edge.

13. The cutting insert according to claim 1, wherein the cutting insert is indexable and the first plurality of cutting edges includes two to eight identical main cutting edges.

14. A milling tool comprising:
a tool body provided with an insert seat; and
the cutting insert according to claim 1 arranged in the insert seat.

15. A tool body for a milling tool, the tool body having a central rotation axis around which the tool body is rotatable in a direction of rotation, wherein the tool body comprises:
a front end and a rear end between which an envelope surface extends; and
at least one insert seat between the front end and the envelope surface, wherein said insert seat includes a bottom contact surface configured to support the lower central main support surface of the lower side of the cutting insert according to claim 1, and wherein the insert seat includes a recess extending between the bottom contact surface and the envelope surface, said recess configured to accommodate a plateau of the lower side of the cutting insert.

16. The cutting insert according to claim 12, wherein the third transition surface is radially inward of the active corner cutting edge and the secondary cutting edge.

17. The cutting insert according to claim 12, wherein the third transition surface is radially inward of the projecting major portion of the main cutting edge, the active corner cutting edge, and the secondary cutting edge.

18. The cutting insert according to claim 1, wherein the lower side is identical to the upper side.

19. The cutting insert according to claim 1, wherein, in a view along the centre axis, the body has a shape of a polygon.

20. The cutting insert according to claim 1, wherein for each of the first plurality of cutting edges and in a view normal to the upper extension plane and along the center axis, the secondary cutting edge is oriented at an angle to the main cutting edge.

21. The cutting insert according to claim 1, wherein the first plurality of cutting edges includes a first cutting edge and a second cutting edge, and wherein, in a view normal to the upper extension plane and along the center axis, the secondary cutting edge of the first cutting edge is oriented at an angle to the main cutting edge of the first cutting edge.

22. The cutting insert according to claim 21, wherein the secondary cutting edge of the first cutting edge is connected to a second end of the main cutting edge of the second cutting edge, and wherein, in the view normal to the upper extension plane and along the center axis, the secondary cutting edge of the first cutting edge is oriented at an angle to the main cutting edge of the second cutting edge.

23. The cutting insert according to claim 1, wherein the upper central main support surface includes a flat surface extending in parallel with the upper extension plane.

24. The cutting insert according to claim 12, wherein the upper central main support surface extends from the through hole to the third transition surface.

25. A cutting insert for a milling tool comprising:

a body having an upper side and a lower side;

a plurality of peripheral side surfaces extending between the upper side and the lower side;

a first plurality of cutting edges, each of the first plurality of cutting edges formed in a respective one of a plurality of first transition surfaces between the upper side and a respective one of the plurality of peripheral side surfaces; and a through hole connecting the upper side to the lower side and extending around a center axis, wherein the cutting insert is double-sided, wherein the upper side includes an upper extension plane and an upper central main support surface that, with respect to the center axis, extends radially from the through hole and is recessed axially inward with respect to the upper extension plane, wherein the lower side is opposite to the upper side and includes a second plurality of cutting edges, a lower central main support surface, and a lower extension plane, where the upper extension plane is defined by an axially distalmost portion of each of the first plurality of cutting edges with respect to a plane midway between the upper central main support surface and the lower central main support surface and the lower extension plane is defined by an axially distalmost portion of each of the second plurality of cutting edges with respect to said plane, wherein the centre axis extends perpendicularly through the upper and lower extension planes, wherein the at least one cutting edge includes a main cutting edge between the upper side and a main part of the peripheral side surface and a secondary cutting edge connected to a first end of the main cutting edge by an active corner cutting edge, wherein, in a view normal to the upper extension plane and along the center axis, the secondary cutting edge is oriented at an angle to the main cutting edge, wherein at least a projecting major portion of the main cutting edge projects above the central main support surface, wherein the projecting major portion of the main cutting edge is at least in part positively inclined with respect to the upper extension plane and forms an angle $\phi_1$ with the upper extension plane as seen in a side view of the cutting insert and in a direction orthogonal to the main part of the peripheral side surface, wherein the upper side includes at least one rake surface extending inside of and along the at least one cutting edge, wherein the rake surface slopes downward toward the central main support surface when seen in sections perpendicular to the peripheral side surface, wherein a plateau extends extending at least along the projecting major portion of the main cutting edge formed inside of the at least one rake surface, where wherein the plateau is elevated with respect to the central main support surface, wherein, as seen in the side view and in the direction orthogonal to the main part of the peripheral side surface, a second transition surface between the rake surface and the plateau extends along said main part of the peripheral surface at an angle $\phi_2$ with respect to the upper extension plane, wherein where $\phi_2 > 0°$, and wherein the upper side further comprises a third transition surface connecting the plateau and the central main support surface, and the third transition surface is positively inclined as seen in a vertical section taken perpendicularly to the main cutting edge.

* * * * *